(12) United States Patent
Jing et al.

(10) Patent No.: US 6,849,314 B2
(45) Date of Patent: Feb. 1, 2005

(54) FLUOROPOLYMER BLENDS AND MULTILAYER ARTICLES

(75) Inventors: Naiyong Jing, Woodbury, MN (US); Tatsuo Fukushi, Woodbury, MN (US); Attila Molnar, Vadnais Heights, MN (US); David B. Bilbrey, Woodbury, MN (US); Mark W. Muggli, West St. Paul, MN (US); Andrew M. Hine, St. Paul, MN (US); Kathryn M. Spurgeon, River Falls, WI (US); Christopher A. Haak, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/125,936

(22) Filed: Apr. 18, 2002

(65) Prior Publication Data

US 2003/0198769 A1 Oct. 23, 2003

(51) Int. Cl.[7] .......................... B32B 1/08; B32B 27/06; B32B 27/28; F16L 11/20; F16L 9/14
(52) U.S. Cl. .................... 428/36.91; 428/422; 428/421; 428/457; 138/124; 138/125; 138/126; 138/127; 138/137; 138/138; 138/140; 138/141
(58) Field of Search .............................. 428/36.91, 421, 428/422, 457; 138/124, 125, 126, 127, 137, 138, 140, 141

(56) References Cited

U.S. PATENT DOCUMENTS

| | | |
|---|---|---|
| 2,789,063 A | 4/1957 | Purvis et al. |
| 3,418,302 A | 12/1968 | Darby |
| 3,484,503 A | 12/1969 | Magner et al. |
| 3,987,126 A | 10/1976 | Brodoway |
| 4,148,982 A | 4/1979 | Morozumi et al. |
| 4,214,060 A | 7/1980 | Apotheker et al. |
| 4,260,698 A | 4/1981 | Tatemoto et al. |
| 4,287,322 A | 9/1981 | Worm |
| 4,338,237 A | 7/1982 | Sulzbach et al. |
| 4,413,094 A | 11/1983 | Aufdermarsh, Jr. |
| 4,463,144 A | 7/1984 | Kojima et al. |
| 4,530,970 A | 7/1985 | Morozumi et al. |
| 4,552,925 A | 11/1985 | Nakagawa et al. |
| 4,555,543 A | 11/1985 | Effenberger et al. |
| 4,560,737 A | 12/1985 | Yamamoto et al. |
| 4,600,651 A | 7/1986 | Aufdermarsh et al. |
| 4,647,413 A | 3/1987 | Savu |
| 4,659,625 A | 4/1987 | Decroly et al. |
| 4,713,418 A | 12/1987 | Logothetis et al. |

(List continued on next page.)

FOREIGN PATENT DOCUMENTS

| | | |
|---|---|---|
| EP | 0 962 311 A1 | 12/1999 |
| EP | 1 039 199 A2 | 9/2000 |
| JP | 52-086442 | 7/1977 |
| JP | S60-23701 | 6/1985 |
| JP | 61-21141 | 1/1986 |
| JP | 09/176425 | 7/1997 |
| WO | WO 98/08679 | 3/1998 |
| WO | WO 00/13891 | 3/2000 |
| WO | WO 01/98405 | 12/2001 |
| WO | WO 02/00741 | 1/2002 |
| WO | WO 02/14065 | 2/2002 |
| WO | WO 02/14066 | 2/2002 |
| WO | WO 02/16111 | 2/2002 |
| WO | WO 02/16131 | 2/2002 |
| WO | WO 03/037621 | 5/2003 |

OTHER PUBLICATIONS

*Macromolecules*, 2001, 34, "Miscibility Study in Fluorinated Tetrafluoroethylene Copolymer—Copolymer Blends", Pucciariello & Villain, pp. 1764–1771.
*Macromolecules*, 2000, 36, "Melt–Processable Poly(tetrafluorethylene)", Tervoort, Visjager, Graff & Smith, pp. 6460–6465.
*Fluoroplastics: Non–Melt Processible Fluoroplastics: The Definitive User's Guide and Databook*, "Fluoropolymers: Properties and Structure", Feb. 2000, pp. 23–32.
*Journal of Polymer Science: Part B: Polymer Physics*, vol. 37, 1999 John Wiley & Sons, Inc., "Phase Behavior of Crystalline Blends of Poly(tetrafluoroethylene) and of Random Fluorinated Copolymers of Tetrafluoroethylene", pp. 679–689.
*Modern Fluoropolymers*, John Wiley & Sons, Chapter 7, "Adhesion Properties of Fluoropolymers", D.M. Brewis and I. Mathieson, pp. 165–172 (1997).
*Journal Adhesion*, 41, "Adhesion Studies of Fluoropolymers", D.M. Brews, I. Mathieson and I. Sutherland, pp. 113–128 (1993).
*Science*, 251, 898, F.S. Bates, 1991.
*SPI Fluoropolymer Fall Conference*, Oct. 1–3, 1995, "Fluoropolymer Cladding of Non–Fluoropolymeric Materials", John A. Effenberger–Chemfab.

*Primary Examiner*—Harold Pyon
*Assistant Examiner*—Chris Bruenjes
(74) *Attorney, Agent, or Firm*—Dean M. Harts

(57) ABSTRACT

Disclosed are various fluoropolymer blend combinations and multilayer articles comprising a blend in a first layer and a second layer comprising a polymer bonded to the first layer. The invention also provides an article comprising a first layer comprising a blend of two or more fluoropolymers, and a second layer bonded to the first layer, the second layer comprising a partially-fluorinated thermoplastic polymer, a perfluorinated thermoplastic polymer, or a combination thereof. The invention also provides an article comprising a first layer comprising a blend of two or more fluoropolymers, at least one of which comprises a partially-fluorinated thermoplastic polymer, and optionally at least one perhalogenated polymer, and a second layer bonded to the first layer, the second layer comprising an at least partially-fluorinated thermoplastic polymer. The invention also provides processes for preparing blended fluoropolymers and multilayer articles comprising a fluoropolymer layer.

53 Claims, No Drawings

U.S. PATENT DOCUMENTS

| | | |
|---|---|---|
| 4,745,165 A | 5/1988 | Arcella et al. |
| 4,749,752 A | 6/1988 | Youlu et al. |
| 4,886,689 A | 12/1989 | Kotliar et al. |
| 4,897,457 A | 1/1990 | Nakamura et al. |
| 4,910,276 A | 3/1990 | Nakamura et al. |
| 4,935,467 A | 6/1990 | Cheng et al. |
| 5,006,594 A | 4/1991 | Rees |
| 5,051,479 A | 9/1991 | Logothetis et al. |
| 5,057,345 A | 10/1991 | Barrett |
| 5,109,071 A | 4/1992 | Johnson et al. |
| 5,141,800 A | 8/1992 | Effenberger et al. |
| 5,170,011 A | 12/1992 | Martucci |
| 5,192,476 A | 3/1993 | Green |
| 5,240,775 A | 8/1993 | Tannenbaum |
| 5,252,401 A | 10/1993 | Kitto et al. |
| 5,285,002 A | 2/1994 | Grootaert |
| 5,320,888 A | 6/1994 | Stevens |
| 5,354,811 A | 10/1994 | Kamiya et al. |
| 5,383,087 A | 1/1995 | Noone et al. |
| 5,427,831 A | 6/1995 | Stevens |
| 5,476,080 A | 12/1995 | Brunnhofer |
| 5,512,225 A | 4/1996 | Fukushi |
| 5,552,199 A | 9/1996 | Blong et al. |
| 5,554,425 A | 9/1996 | Krause et al. |
| 5,566,570 A | 10/1996 | Hankel et al. |
| 5,566,720 A | 10/1996 | Cheney et al. |
| 5,573,039 A | 11/1996 | Mang |
| 5,613,524 A | 3/1997 | Martucci |
| 5,626,930 A | 5/1997 | Fukushi |
| RE35,527 E | 6/1997 | Martucci |
| 5,653,266 A | 8/1997 | Reynolds et al. |
| 5,655,572 A | 8/1997 | Marena |
| 5,656,121 A | 8/1997 | Fukushi |
| 5,658,670 A | 8/1997 | Fukushi et al. |
| 5,658,671 A | 8/1997 | Fukushi |
| 5,733,981 A | 3/1998 | Coggio et al. |
| 5,741,855 A | 4/1998 | Kaduk et al. |
| 5,827,587 A | 10/1998 | Fukushi |
| 5,855,977 A | 1/1999 | Fukushi et al. |
| 5,908,704 A | 6/1999 | Friedman et al. |
| 5,916,659 A | 6/1999 | Koerber et al. |
| 5,931,201 A | 8/1999 | Hsich |
| 5,934,336 A | 8/1999 | Hsich |
| 5,960,977 A | 10/1999 | Ostrander et al. |
| 5,974,649 A | 11/1999 | Marena |
| 6,012,496 A | 1/2000 | Hsich et al. |
| 6,039,084 A | 3/2000 | Martucci et al. |
| 6,039,085 A | 3/2000 | Hsich |
| 6,074,719 A | 6/2000 | Fukushi et al. |
| 6,077,609 A | 6/2000 | Blong et al. |
| 6,080,487 A | 6/2000 | Coggio et al. |
| 6,117,508 A | 9/2000 | Parsonage et al. |
| 6,155,304 A | 12/2000 | Hsich et al. |
| 6,176,268 B1 | 1/2001 | Hsich et al. |
| 6,192,942 B1 | 2/2001 | Hsich et al. |
| 6,194,050 B1 | 2/2001 | Koerber et al. |
| 6,197,393 B1 | 3/2001 | Jing et al. |
| 6,203,873 B1 | 3/2001 | Shifman et al. |
| 6,257,280 B1 | 7/2001 | Marena |
| 6,263,920 B1 | 7/2001 | Hsich et al. |
| 6,265,462 B1 | 7/2001 | Egitto et al. |
| 6,270,901 B1 | 8/2001 | Parsonage et al. |
| 6,310,141 B1 | 10/2001 | Chen et al. |
| 6,346,328 B1 | 2/2002 | Parsonage et al. |
| 6,361,641 B1 | 3/2002 | Blong et al. |
| 2001/0034414 A1 | 10/2001 | Effenberger et al. |
| 2002/0003441 A1 | 1/2002 | Steensgaard-Madsen |
| 2003/0008151 A1 | 1/2003 | Araki et al. |

FLUOROPOLYMER BLENDS AND MULTILAYER ARTICLES

TECHNICAL FIELD

This invention relates to fluoropolymer blends, an assembly of fluoropolymers useful in sheets which may be multi-layered, a hose such as for conveying fuels or chemicals, and the like, and processes for preparing multilayer articles such as tubing.

BACKGROUND

Blending polymers is a simple and effective way to develop a new polymer composition possessing properties which may not be available in a single known polymer or which would require time-consuming and expensive development of an entirely new polymer. Thus, polymer blends often are used to produce a composition having some of the desired mechanical, theological, and adhesion properties found in the individual polymers used in the blend.

Fluoroplastics are used due to their properties, e.g., chemical resistance and low fuel permeation. Automotive applications, such as fuel hoses, demand lower and lower fuel permeation to minimize emissions and meet stronger environmental standards. These applications demand fluoropolymers. Thin layers of fluoropolymers often are used in combination with other materials, which provide resilience, strength, durability, and other desired properties in a composite. However, fluoropolymers are known to be difficult to bond. A variety of methods have been used to promote adhesion between fluoropolymers and non-fluoropolymers as well as between two fluoropolymers such as THV and FKM. These methods include treating the surface of one or both of the layers, using blends of two polymers such as a polyamide with a THV, mixing a polyamide and a grafted fluoropolymer having polar functionality, using tie layers, and using adhesives.

SUMMARY

Briefly, the present invention provides a fluoropolymer comprising a blend of a substantially non-vinylidene fluoride containing partially fluorinated-thermoplastic and a perfluorothermoplastic. In another aspect, the present invention provides a fluoropolymer comprising a blend of two or more perfluoropolymers and a partially fluorinated-thermoplastic polymer. In another aspect, the present invention provides a fluoropolymer comprising a blend of two or more different partially-fluorinated thermoplastic polymers having interpolymerized units derived from a substantial amount of VDF. In yet another aspect, the present invention provides a fluoropolymer comprising a blend of three or more partially-fluorinated thermoplastic polymers.

In another aspect, the present invention comprises a blend of a polymer having a surface energy below about 20 mJ/m$^2$ and a polymer having a surface energy having below about 25 mJ/m$^2$, wherein the difference of the surface energy between the first layer and the second layer is from 1 mJ/m$^2$ to 5 mJ/m$^2$.

In another aspect, the present invention comprises a fluoropolymer composition comprising a perfluoropolymer, and from about 5 to about 50 weight percent, based on the fluoropolymer composition, of a partially-fluorinated polymer, wherein the fluoropolymer composition has a Permeation Constant less than about 25% greater than the perfluoropolymer alone. This composition may be used in a multilayer article, such as those disclosed herein.

In another aspect, the present invention provides an article comprising a first layer comprising a blend as described in the preceding paragraphs of this section, and a second layer comprising a polymer bonded to the first layer.

In another aspect, the present invention provides an article comprising a first layer comprising a blend of a partially fluorinated-thermoplastic and a perfluorothermoplastic, and a second layer bonded to the first layer, the second layer comprising a polymer selected from elastomers, polyolefins, and polyamides lacking pendant amines.

In another aspect, the present invention provides an article comprising a first layer comprising a blend of two or more fluoropolymers, which may be perfluorinated, and a second layer bonded to the first layer, the second layer comprising a partially-fluorinated thermoplastic polymer, a perfluorinated thermoplastic polymer, or a combination thereof.

In another aspect, the present invention provides an article comprising a first layer comprising a blend of two or more fluoropolymers, at least one of which comprises a partially-fluorinated thermoplastic polymer, and optionally at least one perhalogenated polymer, and a second layer bonded to the first layer, the second layer comprising an at least partially-fluorinated thermoplastic polymer.

In another aspect, the present invention provides a process for preparing a layered article comprising providing a first layer comprising a blend of polymers as described in the summary above, providing a second layer contacting the first layer, the second layer comprising an at least partially-fluorinated polymer, and heating at least one layer and the interface between the layers to a temperature above the softening point or melting point of at least one of the layers.

In still another aspect, the present invention provides a process for preparing a layered article comprising extruding a first layer comprising a blend of polymers as described in the summary above, extruding a second layer comprising an at least partially-fluorinated polymer on a surface of the first layer, and wherein said first layer and said second layer are bonded while at least one layer is above its melting point or softening point.

As used herein:

"perhalogenated" means that any carbon-bonded hydrogens are replaced by halogen atoms such as chlorine or fluorine, and when all carbon-bonded hydrogens are replaced with fluorine, the term "perfluorinated" is used;

"partially fluorinated" means that not all carbon-bonded hydrogens are replaced by fluorine such that one or more hydrogens remains, and preferably at least one-fourth of the hydrogen atoms bonded to carbon atoms are replaced with fluorine atoms;

"fluorinated thermoplastic" means a fluoropolymer having a distinct melting point, as distinguished from amorphous materials such as fluoroelastomers that usually do not have such a melting point; "thermoplastic elastomer" means a rubber-like material that can be process like thermoplastic materials, and "substantially solid" means less than 30% of the volume of a layer is comprised of enclosed voids or gases such as prevalent in foamed constructions.

It is an advantage of the present invention to provide various fluoropolymer blends, and multilayer articles comprising a fluoropolymer blend. For example, a multi-layer construction having a perfluoropolymer as a protecting layer and its blend with a partially fluorinated polymer as a second layer, and a multi-layer construction having perfluoropolymer-containing blends as mentioned above as a protecting layer and partially fluorinated polymer as a second layer.

In one aspect, one or more layers in the article of the invention is substantially solid, containing less than 30% of its volume comprise of enclosed voids or gases such as prevalent in foamed constructions. In other embodiments, less than 20%, less than 10% or even 0% of the volume of a layer comprises enclosed voids or gases.

The interlayer adhesion of the inventive constructions is sufficiently strong to make these constructions suitable for practical uses. It is an advantage of the present invention to provide multilayer fluoropolymer articles that include a fluoropolymer blend in at least one layer, such as sheets, tubing, hoses, and other shaped articles. These blends also can be used as tie layers, such as for bonding perfluorinated polymers including fluorinated ethylene propylene (FEP) and tetrafluoroethylene-perfluoropropylalkoxy (PFA) to some partially fluorinated polymers such as those derived from tetrafluoroethylene (TFE), hexafluoropropylene (HFP), and vinylidene fluoride (VDF), which enables a plethora of constructions heretofore unknown. In addition, the invention can be used as a modified perfluorinated polymer, which can be bonded to a variety of organic and inorganic substrates. Among the many applications of the invention are: biomedical devices, electronic materials, and binders (low dielectric constants and high thermal stability), low surface energy adhesive tapes, anti-graffiti films, and multi-layer fuel system hoses and tubes. The mechanical properties of these blends provide desirable levels of flexibility, tensile strength, and elongation.

Other features and advantages of the invention will be apparent from the following detailed description of the invention and the claims. The above summary of principles of the disclosure is not intended to describe each illustrated embodiment or every implementation of the present disclosure. The following details more particularly exemplify certain preferred embodiments utilizing the principles disclosed herein.

DETAILED DESCRIPTION

The present inventors have discovered that blends of two or more fluoropolymers in various ratios are visually clear. Surprisingly, these blends, in particular the partially-fluorinated polymer blends, can be adhered to notoriously inert fluoropolymer such as FEP and (tetrafluoroethylene-ethylene) ETFE without any additional chemical treatments, at the same time they are bondable to partially fluorinated polymers such as those derived from TFE, HFP, and VDF, and the like, as well as other partially fluorinated polymers, which previously were known to bond to organic and inorganic substrates by tie layer or primer chemistries. The articles of the invention have excellent interlayer adhesion and these multi-layer articles remain transparent.

The invention provides various fluoropolymer blends including a blend of a substantially non-vinylidene fluoride containing partially fluorinated-thermoplastic and a perfluorothermoplastic, a blend of two or more perfluoropolymers and a partially fluorinated-thermoplastic polymer, a blend of two or more different partially-fluorinated thermoplastic polymers having interpolymerized units derived from VDF, and a blend of three or more partially-fluorinated thermoplastic polymers. In addition, the invention provides a fluoropolymer composition comprising a perfluoropolymer, and from about 5 to about 50 weight percent, based on the fluoropolymer composition, of a partially-fluorinated polymer, wherein the fluoropolymer composition has a Permeation Constant less than about 50% greater (preferably less than about 25% greater, more preferably less than about 15% greater) than the perfluoropolymer alone. In this aspect, copolymers of TFE, HFP, and VDF, and optionally a perfluorovinyl ether are blended with a perfluoropolymer.

Among the useful combinations are ratios of about 99.9 weight percent (wt %) to about 0.1 wt % of FEP with the balance being THV, about 99.9 weight percent (wt %) to about 0.1 wt % of ETFE with the balance being a copolymer derived from tetrafluoroethylene-hexafluoropropylene-ethylene (HTE).

The first layer of an article according to the present invention includes one or more thermoplastic perhalogenated polymers. These polymers typically have melting temperatures ranging from about 100 to about 330° C., more preferably from about 150 to about 310° C. Materials in this class include FEP, PFA, and polychlorotrifluoroethylene (PCTFE). FEP resins are random copolymers of TFE with HFP. The HFP content in FEP ranges from about 10 to 15 wt % in many commercial versions, while others include HFP at levels of 25 wt % and 50 wt %.

The partially fluorinated-thermoplastics useful in the invention include various combinations of interpolymerized units of TFE, HFP, VDF, perfluoro alkyl or alkoxy vinyl ethers, and nonfluorinated olefins. Materials in this class include TFE/HFP/VDF copolymers such as THV, ETFE, HTE, polyvinylidene fluoride (PVDF), TFE/P, polyethylenechlorotrifluoroethylene (ECTFE).

In one aspect, the invention comprises a "substantially non-vinylidene fluoride containing" fluoropolymer, which means a fluoropolymer lacking interpolymerized units of vinylidene fluoride, such as PVF, ETFE, HTE, TFE/P, and polychlorotrifluoroethylene (PCTFE).

A copolymer having a VDF content between about 3 and 30 wt % (preferably between about 5 and 25) and a different copolymer having a VDF content between about 20 and 60 wt % (preferably between about 20 and 50) comprise a useful combination in the present invention.

In one aspect, at least one layer comprises interpolymerized units of a hydrogen-containing monomer having a pH at or below the pH of vinylidene fluoride.

Partially fluorinated polymers of VDF, HFP and TFE are known to be readily dehydrofluorinated by bases in the presence of a phase transfer catalyst. This is thought to occur because the methylene groups of VDF are surrounded by fluorocarbons (resulting from an interpolymerized vinylidene fluoride monomer), which are known to be electron-withdrawing groups. As a result, the hydrogen of the methylene units become more acidic and are susceptible to base attack to undergo dehydrofluorination. The newly formed C—C double bonds enable bonding to organic and inorganic substrates having nucleophilic functionalities. Monomers useful in polymers of the invention which are similar to VDF in this respect include $CFH=CF_2$, $CH_2=CHF$, $CH_2=CHR_f$, perfluoroaryl vinyl ether, $CF2=CHR_f$, wherein $R_f$ is a $C_1$–$C_{10}$ perfluoroalkyl group.

Any known fluoroelastomer or perhalogenated elastomer can be used when the material meets the definition required for the inventive composition.

The perhalogenated polymer typically comprises interpolymerized units of Formula I:

$$-CF(X)-CX_2-, \tag{I}$$

wherein each X is independently a halogen atom or perhalogenated $C_1$–$C_3$ alkyl group. Useful examples include interpolymerized units such as tetrafluoroethylene (TFE) and chlorotrifluoroethylene (CTFE). Specific examples of suitable monomers include TFE, perfluorobutylethylene, and HFP. In one embodiment, at least one perhalogenated polymer comprises at least 40 weight percent (wt %) of its interpolyrnerized units of Formula I. In another embodiment, at least one perhalogenated polymer comprises at least 80 wt % of its interpolymerized units of Formula I. In another embodiment, at least one perhalogenated polymer comprises at least 95 wt % of its interpolymerized units of Formula I. The perhalogenated polymer may further include interpolymerized units derived from other perfluorinated monomers in various combinations. These include homopolymers as well as copolymers which have two or more different interpolymerized units of Formula I.

The perhalogenated polymer also may comprise interpolymerized units of Formula II:

(II)

wherein each Y is independently O or $CF_2$; each Z is independently F or $R_f$ wherein each $R_f$ is independently a $C_1$–$C_{10}$ perfluoroalkyl group; and n is 0–3.

The perhalogenated polymer also may comprise interpolymerized units of Formula II, above. The perhalogenated polymer also may comprise interpolymerized units of the formula —$CF_2$—$CF(X')$—, wherein each X' is independently Cl, Br, $R_f$, $O(R_fO)_aR_f$, wherein each $R_f$ is independently a $C_1$–$C_{10}$ perfluoroalkyl group and a is 0–10, or a unit according to Formula II (as described above). The perhalogenated polymer also may comprise interpolymerized units of formula —$CF_2$—O—Y—$CF_2$—, wherein Y is a bond or $CF_2$.

The perhalogenated polymer also may comprise interpolymerized units of a perfluorinated vinyl ether of Formula IV:

(III)

wherein each $R_f$ is independently a linear or branched $C_1$–$C_6$ perfluoroalkyl group; and a is 0 or an integer from 1 to 20.

Specific examples of suitable perfluorinated monomers include hexafluoropropylene (HFP), 3-chloropentafluoropropene, and perfluorinated vinyl ethers such as $CF_2$=$CFOCF_3$, $CF_2$=$CFOCF_2CF_2OCF_3$, $CF_2$=$CFOCF_2CF_2CF_2OCF_3$, $CF_2$=$CFOCF_2CF_2CF_3$, $CF_2$=$CFOCF_2CF(CF_3)OCF_2CF_2CF_3$, and $CF_2$=$CFOCF_2CF(CF_3)OCF_2CF(CF_3)OCF_2CF_2CF_3$.

The fluoropolymers useful in the invention also may comprise interpolymerized units of —$CF(X')$—$CX'_2$—, wherein each X' is independently hydrogen, a halogen atom, a $C_1$–$C_{10}$ alkyl group, R', OR', or $O(R'O)_aR'$, wherein each R' is independently a $C_1$–$C_{10}$ alkyl group (more preferably $C_1$–$C_4$) which may be fluorinated or perfluorinated (as described above) and wherein a is 0 or an integer from 1 to 10.

Specific examples of suitable partially fluorinated monomers include vinyl fluoride and VDF, TFE, perfluorobutylethylene, and HFP.

The fluoropolymers useful in the invention also may comprise interpolymerized units of TFE and a non-fluorinated monomer having interpolymerized units according to Formula V:

(IV)

wherein each R is independently hydrogen, a halogen atom, or a $C_1$–$C_8$ alkyl group.

Specific examples of suitable monomers in this category include nonfluorinated olefins such as ethylene and propylene.

In another aspect, the invention provides an article comprising a first layer comprising a blend as described above in this section and a second layer bonded to the first layer. The second layer may comprise a reinforcing material. Such a material optionally may be used as a separate layer or included within a layer in a multi-layer embodiment of the present invention. Such reinforcing layers may include, e.g., wire or fiberglass braiding. The second layer may comprise a polymer. Such polymers include polyamides, polyimides, polyurethanes, polyolefins, polystyrenes, polyesters, polycarbonates, polyketones, polyureas, polyacrylates, polymethacrylates, acrylonitrile butadiene, butadiene rubber, chlorinated and chloro-sulfonated polyethylene, chloroprene, EPM, EPDM, PE-EPDM, PP-EPDM, EVOH, epichlorihydrin, isobutylene isoprene, isoprene, polysulfides, silicones, NBR/PVC, styrene butadienes, and vinyl acetate ethylenes, and combinations thereof. The second layer may comprise an inorganic substrate such as metal, glass, ceramic, and combinations thereof.

In another aspect, the invention provides an article comprising a first layer comprising a blend of a partially fluorinated-thermoplastic and a perfluorothermoplastic, and a second layer bonded to the first layer, the second layer comprising a polymer selected from elastomers, polyolefins, and polyamides lacking pendant amines. In this embodiment, any known elastomer can be used provided that the elastomer does not include a pendant primary or secondary amine. Materials useful in this aspect include polyamines, and polyolefins such as those polyolefins modified with groups such as maleic anhydride, vinyl acetate, or carboxylic acid.

In another aspect, the invention provides an article comprising a blend of two or more fluoropolymers, which may be perfluorinated, and a second layer bonded to the first layer, the second layer comprising a partially-fluorinated thermoplastic polymer, a perfluorinated thermoplastic polymer, or a combination thereof. These fluoropolymers include those described above, including such materials as chlorotrifluoroethylene.

One layer of an article of the invention can comprise one or more partially-fluorinated thermoplastic polymer(s), and optionally one or more perhalogenated polymer(s). Any of the polymers are described above in this section meeting these general categories can be used.

The article of the invention may also include a bonding interface between the first layer and the second layer of the invention. This interface consists essentially of a first material having the composition of the first layer and a second material having the composition of the second layer.

The blends of the invention, or a layer in a multilayer article of the invention may include known adjuvants such as antioxidants, conductive materials, carbon black, graphite, fillers, lubricants, pigments, plasticizers, processing aids, stabilizers, and the like including combinations of such materials. In some embodiments involving a bonding interface consisting essentially of the composition of the first and second layers of an article of the invention, these adjuvants do not materially improve the bonding properties between these two layers. This embodiment excludes etching, corona discharge, adhesion promoter, or other surface treatment that adds one or more chemical species or removes one or more fluorine or other atoms or otherwise modifies the composition of either layer is used in the bonding interface between the first layer and the second layer of the invention. Similarly, the first and second layers of the article of this embodiment of the invention do not include various other elements known to improve adhesion between a fluoropolymer and another material, such as a tie layer and/or adhesive.

The absence of a surface treatment intended to improve bonding can be noted by the critical surface tension or surface energy of the layers in the invention. For example, one fluoropolymer layer of one embodiment of the invention has a first surface bonded to the second layer, wherein this first surface has a surface energy below about 30 mJ/m$^2$, below about 25, or even below about 22 or 20 mJ/m$^2$. Similarly, the partially fluorinated layer of one embodiment of the invention has a surface bonded to the first layer, wherein this bonding surface has a surface energy below about 30 mJ/m$^2$, below about 25, or even below about 22 or 20 mJ/m$^2$. In some embodiments, a difference in surface energy between two layers is below about to 5 mJ/m$^2$, or below about to 3 mJ/m$^2$.

The present invention also comprises a blend of a polymer having a surface energy below about 20 mJ/m$^2$ and a polymer having a surface energy having below about 25 mJ/m$^2$, wherein the difference of the surface energy between the first layer and the second layer is from 1 mJ/m$^2$ to 5 mJ/m$^2$.

The blends of the invention comprising THV with FEP or other polymers can provide lower surface energy than THV alone. These embodiments are useful for example in anti-graffiti and/or anti-soiling applications.

The bonding interface between the first and second layers provides an interlayer adhesion level of at least about one Newton per centimeter (N/cm), as measured by a peel test according to ASTM D 1876. The interlayer adhesion of the present invention is preferably at least about 2 N/cm, and more preferably at least about 5 N/cm. In some embodiments of the present invention, the interlayer adhesion above about 15 N/cm, above about 30 N/cm, or even about 45 N/cm. Particular embodiments provide interlayer adhesion above about 90 N/cm.

In another embodiment, the interlayer adhesion between the first and second layers of the present invention is at least about one Newton per centimeter (N/cm), as measured by the peel test of ASTM D 1876. The interlayer adhesion of the present invention is preferably at least about 2 N/cm, and more preferably at least about 5 N/cm. In some embodiments of the present invention, the interlayer adhesion above about 15 N/cm, or even about 30 N/cm.

In other embodiments of the invention, interlayer adhesion between any two layers can be improved through any known means. Such routes include, e.g., surface treatments, dehydrofluorinating agents, tie layers, adhesives, and the like.

The thermoplastic polymer of one or more layer(s) of an article of the invention, may include a conductive material to provide an electrostatic dissipative (ESD) fluoroplastic composition. In this aspect of the invention, the ESD polymer composition comprises a sufficient amount of one or more layers to provide ESD properties to the resultant article. Usually, up to about 20 wt % of the conductive material is sufficient in one layer, based on the total weight of that layer. In addition, a minor amount, usually up to about 5 wt %, of another melt processable thermoplastic material such as a hydrocarbon polymer is used as a dispersing aid. In one embodiment of the invention, the dispersing aid does not provide measurable improvement in bonding between the first and second layers and can be used even when a bonding interface between the first and second layers is required. The ESD polymer composition preferably contains about 2 to about 10 wt % of the conductive material and about 0.1 to about 3 wt % of the dispersing aid. Any known conductive filler may be used, such as carbon black and/or graphite. Likewise, any known dispersing aid may be used, such as any of a variety of hydrocarbon polymers. In an aspect of the invention involving a multilayer hose such as for conveying volatile fuel, the ESD composition is preferably included in the interior layer of the hose that is in contact with the fuel. The dispersing aid is preferably fluid at the processing temperature of the layer in which it is used. Additionally, the dispersing aid preferably is immiscible with the polymer of that layer. Typical ESD additive compositions include the hydrocarbon olefin polymers and the poly(oxyalkylene) polymers with the conductive materials such as taught in U.S. Pat. No. 5,549,948, which is herein incorporated by reference.

In another embodiment, the invention includes one or more additional layer(s). In one aspect, this involves a third layer comprising a polymer, the third layer being bonded to the second layer on a surface opposite that to which the first layer is bonded. A third layer comprising a polymer may be bonded to the first layer on a surface opposite that to which the second layer is bonded. In addition, a fourth layer comprising a polymer can be bonded to an exposed surface of a multilayer article of the invention. For example, when a third layer is bonded to the second layer, a fourth layer can be bonded to the third layer or the first layer. Other combinations will be apparent to those skilled in the art and are included within the scope of this invention. The composition of the one or more additional layer(s) may comprise any polymer described above and optionally any known adjuvant.

In addition, other known polymers may be bonded to the surfaces of the first and/or second layer that are not involved in the bonding interface, as well as to third and/or fourth layers such as described above. These other polymers include the fluorinated and perfluorinated polymers described above as well as non-fluorinated polymers such as polyamides, polyimides, polyurethanes, polyolefins, polystyrenes, polyesters, polycarbonates, polyketones, polyureas, polyacrylates, polymethacrylates, acrylonitrile butadiene, butadiene rubber, chlorinated and chlorosulfonated polyethylene, chloroprene, EPM, EPDM, PE-EPDM, PP-EPDM, EVOH, epichlorihydrin, isobutylene isoprene, isoprene, polysulfides, silicones, NBR/PVC, styrene butadienes, and vinyl acetate ethylenes, and combinations thereof.

In another aspect, the invention provides a fuel hose comprising a blend as described above. In another aspect the invention provides a fuel hose comprising a multilayer article as described above. For example, the invention provides a fuel hose comprising a first layer which comprises a blend of two or more fluoropolymers. This fuel hose further comprises a second layer which comprises a fluoropolymer. In addition, an outer layer may be bonded to either of the first or second layers. Also, an intermediate layer comprising a partially-fluorinated polymer can be bonded to the second layer, and optionally this intermediate layer can be bonded to the intermediate layer. The inner layer can comprise a partially-fluorinated elastomer.

Multi-layer articles prepared according to the invention can be provided in a wide variety of shapes, including sheets, films, containers, hoses, tubes, and the like. The articles are especially useful wherever chemical resistance and/or barrier properties are desired. Examples of specific uses for the articles include their use in reflective materials, paint replacement films, drag reduction films, fuel line and filler neck hoses, fuel tanks, exhaust hoses, and the like. The articles are also useful in chemical handling and processing applications, and as wire and cable coatings.

The blends of the invention can be provided through any known means. For example, twin screw compounding, batch mixing, latex blending, dry blending.

One process for preparing a multi-layer article featuring a fluoropolymer blend layer of the present invention involves providing a first layer comprising a blend as described above, providing a second layer bonded to the first layer, the second layer comprising one or more polymer(s) as described above, and heating at least one layer and the interface between the layers to a temperature above the softening point or melting point of at least one of the layers. Generally, the highest melting or softening point of all components used in a blend of the invention defines the preferred minimum temperature for preparing the multi-layer article. For example, when a perfluorothermoplastic is used in a blend, this layer is preferably heated to the melting point of the perfluorothermoplastic or above, and when a perfluoroelastomer is used in a blend layer, this layer is preferably heated to the softening point or the melt processing range of the perfluoroelastomer or above. In addition, the layers are preferably pressed together, such as through a nip or platen or other known means. Generally, increasing the time, temperature, and/or pressure can improve interlayer adhesion. The conditions for bonding any two layers can be optimized through routine experimentation.

Another process for preparing a multi-layer article featuring a fluoropolymer blend layer of the present invention involves coextruding two or more layers through a die to form an article. Such coextrusion processes are useful, e.g., for preparing sheets, tubing, containers, etc.

Still another process for preparing a multi-layer article featuring a fluoropolymer blend layer of the present invention involves extruding one layer through a die to form a length of tubing. A second extruder supplies a crosshead die to coat another layer of molten fluoropolymer onto a surface of the tubing. The blend of the invention can be provided in either the inner or outer layer, or both. Additional layers can be added through similar means. Following the extrusion operations, the multi-layer article may be cooled, e.g., by immersion in a cooling bath. This process can be used to form multilayer sheets of the invention, as well as other shapes, by using extrusion die shapes known in the art. The blend of the invention can be provided to the extrusion process through any known means. For example, dry input materials can be blended before being supplied to an extruder, or a twin screw extruder may be used to blend materials during melt processing.

Objects and advantages of this invention are further illustrated by the following examples, but the particular materials and amounts thereof recited in these examples, as well as other conditions and details, should not be construed to unduly limit this invention.

EXAMPLES

Materials

FEP, a TFE/HFP copolymer, available as Dyneon™ FEP 6307 from Dyneon LLC, Oakdale Minn.

PFA-Flex, a copolymer of TFE/HFP/PPVE, available as PFA-Flex 8515UHP from Dyneon HTE-1500 a copolymer of TFE/HFP/ethylene, available from Dyneon PF-1, a copolymer of 76.0 TFE, 12.0 HFP, and 12.0 VDF (wt %), Tm 237° C., MFI 8.6 (all MFI data was measured using a temperature of 265° C. and 5 kg weight)

PF-2, a copolymer of a copolymer of 73.0 TFE, 11.5 HFP, 11.5 VDF, and 4.0 PPVE (wt %), Tm 222° C., MFI 4.8

PF-3, a copolymer of 60.0 TFE, 18.0 HFP, and 22.0 VDF (wt %), Tm 165° C.

PF-4, a copolymer of 42.0 TFE, 20.0 HFP, and 38.0 VDF (wt %), Tm 125° C.

PF-5, a blend of three copolymers, each having a composition of 73.0 TFE, 11.5 HFP, 11.5 VDF, and 4.0 PPVE (wt %), in a ratio of 8 wt % MFI 0, and 92 wt % of a 2:1 ratio of MFI 10 and MFI 400, Tm 230° C., having a net MFI of 15, for greater detail, see WO 02/00741 or the procedures described in U.S. Pat. No. 6,242,548.

ETFE-EP-610, a copolymer of TFE/ethylene, available from Daikin

FC-2145, a copolymer of HFP and VDF available from Dyneon

Solef™ PVDF 1010, a homopolymer of VDF, available from Solvay, Paris, France

Solef™ HV 11010, a copolymer of HFP and VDF available from Solvay

Test Methods

Permeation Constant:

Permeation constants were obtained using the procedure described in ASTM D 814-86 (Reapproved 1991) with the following changes and details. The glass jar of ASTM D 814 was replaced with a Thwing-Albert Vapometer Permeability Cup as described in ASTM E 96-95. The fluoropolymer side of the test specimen was oriented toward the test liquid. FE-5840Q elastomer (Shore A hardness of about 60, available from Dyneon LLC, Oakdale Minn.) was used for the gaskets instead of neoprene rubber and were located on both the top and bottom of the test specimen. A circular disk of mesh screen was used on top of the gasket to prevent the test specimen from deforming during the test. The test liquid was 100 mL of CE 10 fuel (10% ethanol, 45% iso-octane; 45% toluene). The test temperature was 60° C. The permeation constant (g·mm/m²·day) was calculated by measuring the weight loss for a 30-day period using Mettler AT 400 at an accuracy of 0.1 mg. A slope of the line obtained by the least squares fit of weight loss (grams) versus time (days) was divided by the area of the test specimen and multiplied by its thickness to yield the permeation constant.

Contact Angles and Surface Tension:

Contact angles were measured using a VCA-2500XE (available from AST Products, Billerica, Mass.). Ionized water and n-hexadecane were used for contact angle measurements on the fluoropolymer films described below. An average of measurements made on 3 to 6 different drops of water or hexadecane was used for the contact angle. Surface tension or surface energy of a solid ($\gamma_s$) was calculated using the following equations given by Owens and Wendt (D. K. Owens and R. C. Wendt, *J. Appl. Polym. Sci.* 13, 1741 (1969)) using the polar component of surface energy ($\gamma_s^P$) and the dispersion component of surface energy ($\gamma_s^d$).

$$(1+\cos\theta)\gamma_{L1}^d = 2\sqrt{\gamma_{L1}^d} \times \sqrt{\gamma_s^d} + 2\gamma_{L1}^P \times \sqrt{\gamma_s^P} \qquad \text{Equation 1}$$

$$(1+\cos\theta)\gamma_{L2}^d = 2\sqrt{\gamma_{L2}^d} \times \sqrt{\gamma_s^d} + 2\gamma_{L2}^P \times \sqrt{\gamma_s^P} \qquad \text{Equation 2}$$

wherein $\theta$ is the contact angle, $\gamma_L$ is liquid surface tension, $\gamma_S$ is the solid surface tension and the subscripts 1 and 2 refer to water and n-hexadecane, respectively. The addition of d and p in the superscripts refers to the dispersion and polar components of each. The known $\gamma_L^d$ and $\gamma_L^P$ of each testing liquid at 20° C., i.e., water $\gamma_L^d=18.7$ and $\gamma_L^P=53.6$ and for n-hexadecane $\gamma_L^d=27.0$ and $\gamma_L^P=0$, were used for the calculations. When the contact angles were measured, Equation 1 and 2 were solved simultaneously to give $\gamma_S^d$ and $\gamma_S^P$ of the solid. The surface tension ($\gamma_S$) was defined as the sum of the $\gamma_S^d$ and $\gamma_S^P$ of the solid. Reported values were the average of the surface tension calculated from the contact angles.

Thermal Lamination:

To facilitate testing of the adhesion between the layers via a T-peel test, a strip of a sheet of 0.05 mm thick polyimide film (available as Apical from Kaneka High-Tech Materials, Inc., Pasadena Tex.) was inserted about 0.25 in. (6.4 mm) along one short edge between the two films described below before hot pressing. In earlier samples a PTFE-coated fiber sheet was used, but it adhered to the inventive films.

In some cases, a slight force was necessary to keep good surface contact between the films. The polyimide sheet peeled away from each material and was used only to create tabs of the resulting laminate. These tabs were inserted into the jaws of a test device in the peel test described later. The two-layer sheet was heated under pressure at 290° C. for 1–3 minutes between the platens of a Wabash Hydraulic press to bond the layers, then immediately transferred to a cold press. After cooling to room temperature by a "cold pressing", the resulting sample was subjected to T-peel measurement. The results are shown in the tables below.

Peel Adhesion:

Peel strength between the layers was measured in accordance with ASTM D 1876 (T-Peel Test). Samples were cut into strips 25.4 mm wide by about 2 to 2.5 in. (5 to 6.3 cm) long.

A Model 1125 tester (available from Instron Corp., Canton Mass.) at 100 mm/min crosshead speed was used as the test device. As the layers were separated, the average peel strength of the middle 80% of the sample was measured. The values from the first 10% and the last 10% distance of the crosshead were omitted. When the samples broke within the material without separating the layers at the bonding interface, the peak value was used instead of the average number. The values reported in the tables below were averages of three tested samples.

Examples 1–21

In Example 1, a polymer blend composition of 95 weight percent (wt %) FEP, and 5 wt % PF-1 was compounded in a Plasticorder (an internal bowl mixer equipped with roller blades, available from C.W. Brabender Instuments,Inc., South Hackensack, N.J.) at 290° C. for 20–30 min. at a mixing rate of 90–100 revolutions per minute (rpm). After mixing, the blend was collected and formed into film having a thickness of 0.3 mm by pressing between heated metal platens at 290° C. in a Wabash Hydraulic Press at approximately 30 Kpa pressure for approximately 1 min. The resulting film was visually clear. Samples were cut 1"×2" peel testing. Examples 2–20 were prepared in substantially as described in Example 1 except that the compounding materials and ratios were varied as shown in the table below. In addition, Examples 12 and 13 used a compounding temperature of 310° C. rather than 290° C.

Examples 22–28

Laminations of two layers were prepared as described above in the Thermal Lamination section, and the materials varied as shown in Table 2, below. Examples 22–27 and 29–37 were heat-pressed for 2 min., Example 28 was heat-pressed for 1 min., and Examples 38–48 were heat-pressed for 3 min.

Comparative Examples C1–C3

Laminations of two layers were prepared as described above in the Thermal Lamination section and were heat-pressed for 3 min., using FEP as the base layer and the material of the second layer was varied as shown in Table 2, below.

TABLE 1

Film Compositions

| Example | Polymer A | Wt % | Polymer B | Wt % |
|---------|-----------|------|-----------|------|
| 1 | FEP | 95 | PF-1 | 5 |
| 2 | FEP | 90 | PF-1 | 10 |
| 3 | FEP | 80 | PF-1 | 20 |
| 4 | FEP | 70 | PF-1 | 30 |
| 5 | FEP | 50 | PF-1 | 50 |
| 6 | FEP | 10 | PF-1 | 90 |
| 7 | FEP | 30 | PF-1 | 70 |
| 8 | FEP | 80 | PF-2 | 20 |
| 9 | FEP | 90 | PF-2 | 10 |
| 10 | PFA-Flex | 90 | PF-2 | 10 |
| 11 | PFA-Flex | 80 | PF-2 | 20 |
| 12 | ETFE-EP-610 | 80 | HTE-1500 | 20 |
| 13 | ETFE-EP-610 | 50 | HTE-1500 | 50 |
| 14 | PF-3 | 50 | HTE-1500 | 50 |
| 15 | PF-3 | 60 | HTE-1500 | 40 |
| 16 | PF-3 | 80 | HTE-1500 | 20 |
| 17 | PF-3 | 40 | HTE-1500 | 60 |
| 18 | PF-3 | 70 | HTE-1500 | 30 |
| 19 | PF-3 | 50 | ETFE-EP-610 | 50 |
| 20 | PF-3 | 30 | PF-1 | 70 |
| 21 | PF-1 | 50 | HTE-1500 | 50 |

TABLE 2

Lamination of Blends

| Example | Blend Layer Example | Substrate | Peel (lb/in) | Peel (N/cm) |
|---------|---------------------|-----------|--------------|-------------|
| 22 | 1 | PF-1 | 11.0 | 19.4 |
| 23 | 1 | PF-3 | 7.0 | 12.3 |
| 24 | 2 | PF-1 | 8.9 | 15.7 |
| 25 | 2 | PF-3 | 6.1 | 10.7 |
| 26 | 3 | PF-1 | 8.7 | 15.3 |
| 28 | 3 | PF-4 | 8.2 | 14.4 |
| 29 | 4 | PF-1 | 13.0 | 22.9 |
| 30 | 4 | PF-3 | 11.0 tore | 19.4 |
| 31 | 5 | PF-1 | 16.0 tore | 28.2 |
| 32 | 5 | PF-3 | 7.9 | 13.9 |
| 33 | 7 | PF-1 | 14.0 tore | 24.6 |
| 35 | 6 | PF-1 | >12.0 tore | >21.1 |
| 36 | 6 | PF-3 | >12.0 | >21.1 |
| 38 | 10 | PF-2 | 8.0 | 14.1 |
| 39 | 10 | PF-3 | 10.0 | 17.6 |
| 40 | 10 | PF-1 | 3.6 | 6.3 |
| 41 | 11 | PF-2 | 11.0 | 19.4 |
| 42 | 11 | PF-3 | >12.4 pull out | >21.8 |
| 43 | 11 | PF-1 | >7 tore | >12.3 |
| 44 | 10 | PF-2 | 6.5 | 11.4 |
| 45 | 10 | PF-3 | 4.5 | 7.9 |
| 46 | 10 | PF-2 | 7.0 | 12.3 |
| 47 | 10 | PF-1 | 8.5 tore | 15.0 |
| 48 | 10 | PF-3 | 14.0 | 24.6 |

TABLE 2A

Comparative Peel Data

| Example | Fluoropolymer | Substrate | Peel (lb/in) | Peel (N/cm) |
|---------|---------------|-----------|--------------|-------------|
| C1 | FEP | PF-2 | 5.0 | 8.8 |
| C2 | FEP | PF-1 | 2.7 | 4.8 |
| C3 | FEP | PF-3 | <0.1 | 0.2 |

TABLE 3

Blend Laminations

| Example | Blend Layer Example | Substrate | Peel (lb/in) | Peel (N/cm) |
|---------|---------------------|-----------|--------------|-------------|
| 49 | 21 | HTE-1500 | >15.0 | >26.4 |
| 50 | 21 | PF-1 | >14.0 | >24.6 |
| 51 | 14 | HTE-1500 | >15 tore | >26.4 |
| 52 | 14 | PF-1 | >14 tore | >24.6 |
| 53 | 18 | HTE-1500 | >15 tore | >26.4 |
| 54 | 18 | PF-3 | >14.0 | >24.6 |
| 55 | 16 | HTE-1500 | >20 tore | >35.2 |
| 56 | 16 | PF-1 | 13.7 | 24.1 |
| 57 | 17 | HTE-1500 | >20 tore | >35.2 |
| 58 | 17 | PF-1 | 14.6 | 25.7 |
| 59 | 12 | ETFE-EP-610 | >10 | >17.6 |
| 60 | 20 | FEP | 4.0 | 7.0 |

Examples 61–68

In Example 61, a polymer blend composition of 80 wt % PF-1, and 20 wt % PF-4 was compounded and pressed into a film as described in Example 1. Examples 62–68 were prepared in substantially the same way as described in Example 61 except that the compounding materials and ratios were varied as shown in Table 4, below. Also, Examples 61–68 were heat-pressed for 1 min. at 290° C. to prepare the films, while Example 64 was heat-pressed for 1 min. at 310° C. The resulting films were visually clear. Samples were cut and tested as described in the Peel Adhesion section.

Example 69

This was prepared as in Example 1 except that a polymer blend composition of 80 wt % FEP, 15 wt % PF-1, and 5 wt % of FC-2145 was used.

Example 70

A polymer blend composition was prepared substantially as described in Example 1 except that the compounding mixture was 20 wt % FEP 80 wt % Solvay-PVDF. After mixing, the blend was collected and formed into a film and samples were cut as in Example 1.

Examples 71–90

Laminations of two layers were prepared as described above in the Thermal Lamination section, and the materials were varied as shown in Table 4, below.

Comparative Example C4

Laminations of two layers were prepared as described above in the Thermal Lamination section and were heat-pressed for 3 min., using FEP as the base layer and PF-2 as the second layer.

TABLE 4

Blend Compositions

| Example | Polymer A | Wt % | Polymer B | Wt % | Polymer C | Wt % |
|---------|-----------|------|-----------|------|-----------|------|
| 61 | PF-2 | 80 | PF-4 | 20 | | |
| 62 | PF-2 | 80 | PF-3 | 20 | | |
| 63 | PF-2 | 50 | PF-4 | 50 | | |
| 64 | FEP | 80 | PF-2 | 10 | PFA | 10 |
| 65 | FEP | 80 | PF-2 | 10 | PF-3 | 10 |
| 66 | FEP | 80 | PF-2 | 10 | PF-4 | 10 |
| 67 | FEP | 90 | PF-2 | 5 | PF-3 | 5 |
| 68 | FEP | 90 | PFA | 10 | | |
| 69 | FEP | 80 | PF-2 | 15 | FC-2145 | 5 |
| 70 | FEP | 20 | HV | 80 | | |

TABLE 5

Blend Laminations

| Example | Blend Layer Example | Substrate | Peel (lb/in) | Peel (N/cm) |
|---------|---------------------|-----------|--------------|-------------|
| 71 | 61 | FEP | 12.0 | 21.1 |
| 72 | 62 | FEP | 9.0 | 15.8 |
| 73 | 63 | FEP | 16.7 | 29.4 |
| 74 | 63 | Example 64 | 18.0 | 31.7 |
| 75 | 64 | PF-3 | 12.0 | 21.1 |
| 76 | 64 | PF-4 | 11.0 | 19.4 |
| 77 | 61 | PFA | 10.0 | 17.6 |
| 78 | 61 | Example 68 | 10.0 | 17.6 |
| 79 | 65 | PF-3 | 18.0 | 31.7 |
| 80 | 66 | PF-3 | 16.0 | 28.2 |
| 81 | 65 | PF-2 | 8.0 | 14.1 |
| 82 | 67 | PF-3 | 8.9 | 15.7 |
| 83 | 68 | PF-2 | 4.0 | 7.0 |
| 84 | 68 | PF-3 | 0.4 | 0.7 |
| 85 | 68 | PF-4 | 0.3 | 0.5 |
| 86 | 69 | PF-2 | 9.2 | 16.2 |
| 87 | 69 | PF-3 | 23.5 | 41.4 |
| 88 | 69 | PF-4 | 12.9 | 22.7 |
| 89 | 70 | HV | >25.0 | >44.0 |
| C4 | — | PF-2 | 3.5 | 6.2 |

Examples 90–104

Various weight ratios of a perfluorothermoplastic (FEP) were tumble blended with a partially-fluorinated polymer (PF-3), and then films were extruded using a temperature between 300 and 360° C. A disc having a diameter of 7.72 cm was cut from each film sample and used for permeation testing. Results are summarized in Table 6, below.

In the table below, "n/m" indicates that a property was not measured.

Comparative Examples C5–C9

Homopolymer films were extruded, cut, and tested as in Example 93. Results are summarized in Table 6, below.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

TABLE 6

Permeation and Surface Energy

| Example | Polymer blend ratio (wt %) FEP | Polymer blend ratio (wt %) | Permeation Constant (g · mm/m² · day) | Surface energy (mJ/m²) |
|---|---|---|---|---|
| | | PF-3 | | |
| 90 | 90 | 10 | 0.78 | 18.9 |
| 91 | 80 | 20 | 1.06 | 18.9 |
| 92 | 70 | 30 | n/m | 20.0 |
| 93 | 50 | 50 | 2.21 | 20.3 |
| C5 | 100 | 0 | 0.59 | 17.6 |
| C6 | 0 | 100 | 9.5 | 21.7 |
| | | PF-1 | | |
| 94 | 90 | 10 | 0.71 | n/m |
| 95 | 80 | 20 | 0.86 | n/m |
| 96 | 50 | 50 | 1.00 | 19.4 |
| C7 | 0 | 100 | 2.44 | n/m |
| | | PF-5 | | |
| 97 | 90 | 10 | 0.65 | n/m |
| 98 | 80 | 30 | 0.82 | n/m |
| 99 | 50 | 50 | 1.23 | 18.6 |
| C8 | 0 | 100 | 3.12 | n/m |
| | | PF-2 | | |
| 100 | 90 | 10 | 0.70 | n/m |
| 101 | 50 | 50 | 1.19 | 18.5 |
| C9 | 0 | 100 | 3.63 | n/m |

We claim:

1. An article comprising:
   a) a first layer comprising at least one blend selected from the group consisting of:
      i) a substantially non-vinylidene fluoride, non-vinyl fluoride containing partially fluorinated-thermoplastic and a thermoplastic perfluoropolymer having a melt temperature from about 150 to about 310° C.;
      ii) two or more thermoplastic perfluoropolymers having a melt temperature from about 150 to about 310° C. and a partially fluorinated-thermoplastic polymer;
      iii) two or more different partially-fluorinated thermoplastic polymers having interpolymerized units derived from a substantial amount of vinylidene fluoride (VDF), at least one of: tetrafluoroethylene (TFE) and hexafluoropropylene (HFP), and optionall a perfluoro alkyl or alkoxy vinyl ether;
      iv) three or more partially-fluorinated thermoplastic polymers, wherein the partially fluorinated-thermoplaslic polymers are derived from a combination of interpolymerized units of TFE, HEP, VDF, perfluoro alkyl or alkoxy vinyl ethers, and/or nonfluorinated olefins; and
      v) a perfluoropolymer having a melt temperature from about 150 to about 310° C.; and from about 5 to about 50 weight percent, based on the fluoropolymer composition, of a partially-fluorinated polymer; wherein the fluoropolymer composition has a Permeation Constant less than about 50% greater than the perfluoropolymer alone; and
   b) a second layer comprising a polymer bonded to the first layer.

2. The article of claim 1, wherein
   a) the first layer comprises a blend of a partially fluorinated-thermoplastic and a perfluorothermoplastic; and
   b) the second layer comprises a polymer selected from elastomers, polyolefins, and polyamides lacking pendant amines.

3. The article of claim 1, wherein the blend is selected from group (i), and wherein the partially fluorinated-thermoplastic is derived from a combination of interpolymerized units of tetrafluoroethylene, hexafluoropropylene, perfluoro alkyl or alkoxy vinyl ethers, and nonfluorinated olefins.

4. The article of claim 1, wherein the blend is selected from group (i), and wherein the thermoplastic perfluoropolymer is selected from a fluorinated ethylene propylene, tetrafluoroethylene-perfluoropropylalkoxy, or a combination thereof.

5. The article of claim 1, wherein the blend is selected from group (i), and wherein the blend further comprises a fluoroelastomer and/or a perfluoroelastomer.

6. The article of claim 1, wherein the blend is selected from group (iii), and wherein the blend further comprises a perfluoropolymer derived from interpolymerized units of two or more of tetrafluoroethylene, hexafluoropropylene, and perfluoro alkyl or alkoxy vinyl ethers.

7. The article of claim 1, wherein the blend is selected from group (iii), and wherein one of said thermoplastic polymers has a vinylidene fluoride content between about 3 and 30 weight percent and wherein a second of said thermoplastic polymers has a vinylidene fluoride content between about 20 and 60 weight percent.

8. The article of claim 1, wherein the blend is selected from group (v), and wherein the blend has a Permeation Constant less than about 25% greater than the perfluoropolymer alone.

9. The article of claim 1, wherein the blend is selected from group (v), and wherein the perfluoropolymer is fluorinated ethylene propylene or tetrafluoroethylene-perfluoropropylalkoxy.

10. The article of claim 1, wherein the blend is selected from group (v), and wherein the partially-fluorinated polymer is a copolymer derived from interpolymerized units of tetrafluoroethylene, hexafluoropropylene, and vinylidene fluoride, and optionally a perfluoro alkyl or alkoxy vinyl ether.

11. The article of claim 1, wherein the second layer comprises a partially-fluorinated thermoplastic polymer, a perfluorinated thermoplastic polymer, or a combination thereof.

12. The article of claim 11, wherein a bonding interface between said first layer and said second layer consists essentially of a first material having the composition of said first layer and a second material having the composition of said second layer.

13. The article of claim 11, wherein the first and second layers have an interlayer adhesion level selected from at least about one Newton per centimeter (N/cm), at least about 2 N/cm, and at least about 5 N/cm.

14. The article of claim 11, wherein the first layer and/or second layer has a surface energy below about 25 mJ/m².

15. The article of claim 11, wherein the first layer comprises one or more perhalogenated polymer(s).

16. The article of claim 15, wherein the perhalogenated polymer is perfluorinated.

17. The article of claim 15, wherein the perhalogenated polymer has a first surface having a surface energy within about 5 mJ/m² of the surface energy of the surface of the second layer that is bonded to the first layer.

18. The article of claim 17, wherein the difference in surface energy is below about 3 mJ/m².

19. A fuel hose comprising the article of claim 11.

20. The fuel hose of claim 19, further comprising an outer layer optionally comprising a non-fluorinated polymer.

21. The fuel hose of claim 20, wherein the first layer is bonded to the outer layer and further comprising:
   a) an intermediate layer comprising a partially-fluorinated polymer bonded to the second layer; and optionally
   b) an inner layer bonded to the intermediate layer, the inner layer optionally comprising a partially-fluorinated elastomer and optionally comprising a conductive material.

22. The fuel hose of claim 20, wherein the outer layer comprises a material selected from polyamides, polyimides, polyurethanes, polyolefins, polystyrenes, polyesters, polycarbonates, polyketones, polyureas, polyacrylates, polymethacrylates, acrylonitrile butadiene, butadiene rubber, chlorinated and chloro-sulfonated polyethylene, chloroprene, EPM, EPDM, PE-EPDM, PP-EPDM, EVOH, epichlorihydrin, isobutylene isoprene, isoprene, polysulfides, silicones, NBR/PVC, styrene butadienes, and vinyl acetate ethylenes, and combinations thereof.

23. The article of claim 11, further comprising a third layer, and optionally a fourth layer, wherein the third layer is bonded to the first or second layer.

24. The article of claim 23, wherein one or more polymer (s) comprises a homopolymer.

25. The article of claim 23, wherein one or more polymer (s) comprises a tetrafluoroethylene-perfluoropropylalkoxy (PFA) or a fluorinated ethylene propylene (FEP).

26. The article of claim 23, wherein one or more polymer (s) further comprises a perfluorinated polymer according to Formula II:

(II)

wherein each Y is independently O or $CF_2$; each Z is independently F or $R_f$ wherein each $R_f$ is independently a $C_1-C_{10}$ perfluoroalkyl group; and n is 0–3.

27. The article of claim 23, wherein one or more polymer (s) comprises interpolymerized units of according to the formula —$CF_2$—$CF(X')$—,
wherein each X' is independently Cl, Br, $R_f$, $O(R_fO)_aR_f$, wherein each $R_f$ is independently a $C_1-C_{10}$ perfluoroalkyl group, or a perfluorinated polymer comprising interpolymerized units of Formula II:

(II)

wherein each Y is independently a bond, O, or $CF_2$; each Z is independently F or $R_f$ wherein each $R_f$ is independently a $C_1-C_{10}$ perfluoroalkyl group; a is 0–20; and n is 0–3.

28. The article of claim 23, wherein one or more polymer (s) comprises interpolymerized units according to the formula —$CF_2$—O—Y—$CF_2$—, wherein Y is a bond or $CF_2$.

29. The article of claim 23, wherein one or more polymer (s) comprises a copolymer comprising at least two different interpolymerized monomers.

30. The article of claim 23, wherein one or more polymer (s) comprises a copolymer of tetrafluoroethylene (TFE) with at least one of; hexafluoropropylene (HFP), chlorotrifluoroethylene (CTFE), and a perfluorinated vinyl ether of Formula III:

$$CF_2\!=\!CFO(R_fO)_aR_f \qquad (III)$$

wherein each $R_f$ is independently a linear or branched $C_{1-C6}$ perfluoroalkyl group; and a is 0 or an integer from 1 to 20.

31. The article of claim 23, wherein one or more polymer (s) is selected from a perfluoroelastomer, a perfluorothermoplastic, and combinations thereof.

32. The article of claim 23, wherein at least one layer comprises a partially fluorinated polymer having interpolymerized units of Formula IV:

$$-CF(X')-CX'_2-, \qquad (IV)$$

wherein each X' is independently hydrogen, a halogen atom, a $C_1-C_{10}$ alkyl group, R', OR', or $O(R'O)_aR'$, wherein each R' is independently a $C_1-C_{10}$ alkyl group which may be fluorinated or perfluorinated and a is 0–10.

33. The article of claim 23, wherein at least one layer comprises a material selected from the group consisting of: vinyl fluoride, vinylidene fluoride (VDF), tetrafluoroethylene (TFE), hexafluoropropylene (HFP), a fluorinated alkoxy vinyl ether, a fluorinated alkyl vinyl ether, and combinations thereof.

34. The article of claim 23, at least one layer comprises interpolymerized units of a hydrogen-containing monomer having a pH at or below the pH of vinylidene fluoride.

35. The article of claim 23, wherein least one layer comprises interpolymerized units of vinyl fluoride and/or vinylidene fluoride along with interpolymerized units of a vinyl ether, hexafluoropropylene, and/or tetrafluoroethylene.

36. The article of claim 23, wherein at least one layer comprises interpolymerized units of vinylidene fluoride, hexafluoropropylene, and tetrafluoroethylene, and optionally a vinyl ether.

37. The article of claim 23, wherein one or more layer(s) comprises a polymer having interpolymerized units selected from the group consisting of: tetrafluoroethylene, hexafluropropylene, vinylidene fluoride, a perfluorinated alkoxy vinyl ether, a perfluorinated alkyl vinyl ether, a nonfluorinated olefin, and combinations thereof.

38. The article of claim 23, wherein one or more layer(s) comprises a polymer having interpolymerized units derived from tetrafluoroethylene, hexafluoropropylene, and vinylidene fluoride, and optionally including a perfluorinated alkoxy vinyl ether and/or a perfluorinated alkyl vinyl ether.

39. The article of claim 23, wherein one or more layer(s) comprises a perfluoropolymer selected from a perfluoroelastomer, a perfluorothermoplasic, and combinations thereof.

40. The article of claim 23, wherein one or more layer(s) comprises a non-fluorinated polymer.

41. The article of claim 23, wherein one or more polymer (s) comprises interpolymerized units of Formula I:

$$-CF(X)-CX_2-, \qquad (I)$$

wherein each X is independently a halogen atom or perhalogenated $C_1-C_3$ alkyl group.

42. The article of claim 41, wherein one or more polymer (s) comprises at least 40 weight percent (wt %) of its interpolymerized units of Formula I.

43. The article of claim 41, wherein one or more polymer (s) comprises at least 80 wt % of its interpolymerized units of Formula I.

44. The article of claim 41, wherein one or more polymer (s) comprises at least 95 wt % of its interpolymerized units of Formula I.

45. The article of claim 23, wherein at least one layer comprises a polymer having interpolymerized units derived from tetrafluoroethylene and non-fluorinated interpolymerized units according to Formula V:

$$—CR_2—CR_2— \quad (V)$$

wherein each R is independently hydrogen, a halogen atom, or a $C_1$–$C_8$ alkyl group.

46. The article of claim 45, wherein the non-fluorinated polymer is selected from ethylene, propylene, and combinations thereof.

47. A process for preparing a layered article comprising:
a) providing a first layer comprising at least one blend selected from the group consisting of:
  i) a substantially non-vinylidene fluoride, non-vinyl fluoride containing partially fluorinated-thermoplastic and a thermoplastic perfluoropolymer having a melt temperature from about 150 to about 310° C.;
  ii) two or more thermoplastic perfluoropolymers having a melt temperature from about 150 to about 310° C. and a partially fluorinated-thermoplastic polymer;
  iii) two or more different partially-fluorinated thermoplastic polymers having interpolymerized units derived from a substantial amount or vinylidene fluoride (VDF), at least one of; tetrafluoroethylene (TFE) and hexafluoropropylene (HFP), and optionally at perfluoro alkyl or alkoxy vinyl ether;
  iv) three or more partially-fluorinated thermoplastic polymers, wherein the partially fluorinated-thermoplastic polymers are derived from a combination of interpolymerized units of TFE, HFP, VDF, perfluoro alkyl or alkoxy vinyl ethers, and/or non-fluorinated olefins; and
  v) a perfluoropolymer having a temperature from about 150 to about 310° C.; and from about 5 to about 50 weight percent, based on the fluoropolymer composition, of a partially-fluorinated polymer; wherein the fluoropolymer composition has a Permeation Constant less than about 50% greater than the perfluoropolymer alone;
b) providing a second layer contacting the first layer, the second layer comprising an at least partially-halogenated polymer; and
c) heating at least one layer and the interface between the layers to a temperature above the softening point or melting point of at least one of the layers.

48. A process for preparing a layered article comprising:
a) extruding a first layer comprising at least one blend selected from the group consisting of:
  i) a substantially non-vinylidene fluoride, non-vinyl fluoride containing partially fluorinated-thermoplastic and a thermoplastic perfluoropolymer having a melt temperature from about 150 to about 310° C.;
  ii) two or more thermoplastic perfluoropolymers having a melt temperature from about 150 to about 310° C. and a partially fluorinated-thermoplastic polymer;
  iii) two or more different partially-fluorinated thermoplastic polymers having interpolymerized units derived from a substantial amount of vinylidene fluoride (VDF), at least one of; tetrafluoroethylene (TFE) and hexafluoropropylene (HFP), and optionally a perfluoro alkyl or alkoxy vinyl ether;
  iv) three or more partially-fluorinated thermoplastic polymers, wherein the partially fluorinated-thermoplastlc polymers are derived from a combination of interpolymerized units of TFE, HFP, VDF, perfluoro alkyl or alkoxy vinyl ethers, and/or non-fluorinated olefins;
  v) a perfluoropolymer having a melt temperature from about 150 to about 310° C.; and from about 5 to about 50 weight percent, based on the fluoropolymer composition, of a partially-fluorinated polymer; wherein the fluoropolymer composition has a Permeation Constant less than about 50% greater than the perfluoropolymer alone;
b) extruding a second layer comprising an at least partially-fluorinated polymer on a surface of the first layer;
wherein said first layer and said second layer are bonded while at least one layer is above its melting point or softening point.

49. The process of claim 48 further comprising extruding an outer layer on an exposed surface of the second layer.

50. The process of claim 48 wherein said first layer and said second layer are extruded into a tubular shape, optionally with the layer as an inner layer.

51. The process of claim 48 further comprising extruding an intermediate layer comprising a partially-fluorinated polymer onto the layer comprising a perhalogenated polymer; and extruding an outer layer on a surface of the intermediate layer.

52. The process of claim 48 wherein the extruding steps are performed via coextrusion.

53. The process of claim 48 further comprising a bonding interface between said first layer and said second layer, wherein said bonding interface consists essentially of a first material having the composition of said first layer and a second material having the composition of said second layer.

* * * * *

UNITED STATES PATENT AND TRADEMARK OFFICE
CERTIFICATE OF CORRECTION

PATENT NO. : 6,849,314 B2
DATED : February 1, 2005
INVENTOR(S) : Jing, Naiyong

It is certified that error appears in the above-identified patent and that said Letters Patent is hereby corrected as shown below:

Column 1,
Line 19, "theological" should be shown as -- rheological --

Column 10,
Lines 58 and 61, $*(1+\cos\theta)\gamma_{L1}^{d} = 2\sqrt{\gamma_{L1}^{d}} \times \sqrt{\gamma_{S}^{d}} + 2\ \gamma_{L1}^{p} \times \sqrt{\gamma_{S}^{p}}*$ should be shown as $-- (1+\cos\theta)\gamma_{L1}^{d} = 2\sqrt{\gamma_{L1}^{d}} \times \sqrt{\gamma_{S}^{d}} + 2\sqrt{\gamma_{L1}^{p}} \times \sqrt{\gamma_{S}^{p}} --$ Column 15,
Line 47, "optionall" should be shown as -- optionally --

Column 18,
Line 6, "$C_{1-C6}$" should be shown as -- $C_1$-$C_6$ --
Line 52, "perfluorothermoplasic" should be shown as -- perfluorothermoplastic --

Column 19,
Line 29, "or" should be shown as -- of --
Line 39, after the words "having a" and before "temperature" insert -- melt --

Column 20,
Line 40, after the word "the" and before "layer" insert -- first --

Signed and Sealed this

Twenty-fourth Day of May, 2005

JON W. DUDAS
*Director of the United States Patent and Trademark Office*